(12) United States Patent
Suzuki et al.

(10) Patent No.: US 10,079,106 B2
(45) Date of Patent: Sep. 18, 2018

(54) MULTILAYER CERAMIC CAPACITOR

(71) Applicant: Murata Manufacturing Co., Ltd., Nagaokakyo-shi, Kyoto-fu (JP)

(72) Inventors: Shoichiro Suzuki, Nagaokakyo (JP); Takafumi Okamoto, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 94 days.

(21) Appl. No.: 15/410,046

(22) Filed: Jan. 19, 2017

(65) Prior Publication Data

US 2017/0133155 A1 May 11, 2017

Related U.S. Application Data

(63) Continuation of application No. PCT/JP2015/069946, filed on Jul. 10, 2015.

(30) Foreign Application Priority Data

Aug. 4, 2014 (JP) .................................. 2014-158983

(51) Int. Cl.
*H01G 4/30* (2006.01)
*H01G 4/12* (2006.01)
(Continued)

(52) U.S. Cl.
CPC ............... *H01G 4/30* (2013.01); *C04B 35/49* (2013.01); *H01G 4/012* (2013.01);
(Continued)

(58) Field of Classification Search
CPC ........ H01G 4/30; H01G 4/012; H01G 4/1227; H01G 4/1245; H01G 4/232; C04B 35/49;
(Continued)

(56) References Cited

U.S. PATENT DOCUMENTS

| | | |
|---|---|---|
| 6,437,970 B1 | 8/2002 | Lee et al. |
| 6,649,554 B1 | 11/2003 | Chang et al. |
| 7,312,172 B2 | 12/2007 | Sasaki et al. |
| 2006/0229188 A1 | 10/2006 | Randall et al. |
| 2006/0234853 A1 | 10/2006 | Sasaki et al. |
| 2008/0297979 A1 | 12/2008 | Aman et al. |

(Continued)

FOREIGN PATENT DOCUMENTS

| | | |
|---|---|---|
| JP | 2003526201 A | 9/2003 |
| JP | 2004043279 A | 2/2004 |

(Continued)

OTHER PUBLICATIONS

International Search Report issued for PCT/JP2015/069946, dated Sep. 29, 2015.

(Continued)

*Primary Examiner* — Michael P McFadden
(74) *Attorney, Agent, or Firm* — Arent Fox LLP

(57) ABSTRACT

A multilayer ceramic capacitor that includes a ceramic laminated body having dielectric layers and internal electrodes at the interfaces between the dielectric layers, and external electrodes on the outer surface of the ceramic laminated body. The dielectric layers contain, as their main constituent, a perovskite-type compound including Ba, Ti, Zr, and M. M is at least one element of Ta, Nb, V, and W. The dielectric layers further contain Mn and Si as additive constituents. With respect to the total amount of Ti, Zr, and M, 40 mol % $< Zr \leq 90$ mol %, M is 1 mol % $\leq M \leq 10$ mol %. When the total amount of Ti, Zr, and M is regarded as 100 parts by mol, 1 part by mol $\leq Mn \leq 10$ parts by mol, 1 part by mol $\leq Si \leq 5$ parts by mol, and $0.5 \leq Mn/M \leq 3.0$.

6 Claims, 2 Drawing Sheets

(51) Int. Cl.
*H01G 4/012* (2006.01)
*C04B 35/49* (2006.01)
*H01G 4/232* (2006.01)

(52) U.S. Cl.
CPC ......... *H01G 4/1227* (2013.01); *H01G 4/1245* (2013.01); *H01G 4/232* (2013.01); *C04B 2235/326* (2013.01); *C04B 2235/3215* (2013.01); *C04B 2235/3236* (2013.01); *C04B 2235/3239* (2013.01); *C04B 2235/3249* (2013.01); *C04B 2235/3255* (2013.01); *C04B 2235/768* (2013.01); *C04B 2235/79* (2013.01); *C04B 2235/96* (2013.01)

(58) Field of Classification Search
CPC .... C04B 2235/3215; C04B 2235/3236; C04B 2235/3239; C04B 2235/3249; C04B 2235/3255; C04B 2235/326; C04B 2235/768; C04B 2235/79; C04B 2235/96
USPC ...................................................... 361/301.4
See application file for complete search history.

(56) References Cited

U.S. PATENT DOCUMENTS

2015/0036264 A1* 2/2015 Morita ................ C04B 35/4682
                                                                    361/321.4
2016/0217924 A1* 7/2016 Morita ................ C04B 35/4682

FOREIGN PATENT DOCUMENTS

| JP | 2007119293 A | 5/2007 |
| JP | 2008280231 A | 11/2008 |
| JP | 2009035431 A | 2/2009 |
| JP | 2010010107 A | 1/2010 |
| JP | 20117076 A | 10/2011 |
| WO | WO 2004063119 A1 | 7/2004 |

OTHER PUBLICATIONS

Written Opinion of the International Searching Authority issued for PCT/JP2015/069946, dated Sep. 26, 2015.

* cited by examiner

MULTILAYER CERAMIC CAPACITOR

CROSS REFERENCE TO RELATED APPLICATIONS

The present application is a continuation of International application No. PCT/JP2015/069946, filed Jul. 10, 2015, which claims priority to Japanese Patent Application No. 2014-158983, filed Aug. 4, 2014, the entire contents of each of which are incorporated herein by reference.

FIELD OF THE INVENTION

The present invention relates to a multilayer ceramic capacitor.

BACKGROUND OF THE INVENTION

With computerization of automobiles in recent years, automobiles have come to be equipped with multilayer ceramic capacitors. Further, on-board capacitors for automobiles have been required to keep capacitor characteristics under severe conditions such as high temperatures and high voltages, in particular, keep leakage current and insulation resistance degradation suppressed at high temperatures.

The multilayer ceramic capacitor disclosed in Patent Document 1 is proposed as a countermeasure for this requirement. In this multilayer ceramic capacitor, dielectric layers have a main constituent represented by $BaTi_{(1-x)}Zr_xO_3+aRe+bM$ (where Re is an oxide of at least one rare-earth element of La, Ce, Pr, Nd, Sm, Eu, Gd, Tb, Dy, Ho, Er, Tm, Yb, Lu, and Y, and M is an oxide of at least one metal element of Mg, Al, Cr, Mn, Fe, Ni, Cu, Zn, and V).

Furthermore, the dielectric layers contain a Si element-containing compound to meet 0.2 parts by mass the Si element-containing compound 5.0 parts by mass with respect to 100 parts by mass of the main constituent with $1.000 \leq Ba/Ti \leq 1.450$, $5 \leq 100x \leq 30$, $0.02 \leq a \leq 0.18$, and $0.02 \leq b \leq 0.18$, and grains have a core-shell structure composed of a core part and a shell part surrounding the core part.

Because the capacitor has the composition and microstructure mentioned above, the multilayer ceramic capacitor in Patent Document 1 can improve temperature characteristics of relative permittivity with grain ferroelectricity (piezoelectricity) kept low and electric-field-induced strain reduced.

In addition, the multilayer ceramic capacitor disclosed in Patent Document 2 is proposed as another countermeasure. In this multilayer ceramic capacitor, dielectric layers contain, as their main constituent, a barium titanate, and contain, with respect to 100 mol of the barium titanate, 5 to 15 mol of a constituent composed of $BaZrO_3$ and $SrZrO_3$, 3 to 5 mol of MgO, 4 to 6 mol of $R_2O_3$ (where R is at least one element of Sc, Y, La, Ce, Pr, Nd, Pm, Sm, Eu, Gd, Tb, Dy, Ho, Er, Tm, Yb, and Lu), 0.5 to 1.5 mol of at least one of MnO, $Cr_2O_3$, $Co_3O_4$, and $Fe_2O_3$, and 2.5 to 4 mol of a Si-containing compound. Furthermore, when the previously mentioned constituent is represented by $(1-x)BaZrO_3+xSrZrO_3$, x is 0.4 to 0.9.

Further, the multilayer ceramic capacitor in Patent Document 2 has, even when the dielectric layers are reduced in thickness, a high relative permittivity under a high electric field intensity, and moreover, may have favorable temperature characteristics and reliability.

Patent Document 1: Japanese Patent Application Laid-Open No. 2009-35431
Patent Document 2: Japanese Patent Application Laid-Open No. 2011-207696

SUMMARY OF THE INVENTION

However, in the case of the multilayer ceramic capacitors disclosed in Patent Document 1 and Patent Document 2, leakage current and insulation resistance degradation at high temperatures have been suppressed insufficiently while ensuring a relatively high relative permittivity.

Therefore, an object of present invention is to provide a multilayer ceramic capacitor which can suppress leakage current and insulation resistance degradation at high temperatures while ensuring a relatively high relative permittivity.

One embodiment of the present invention provides a multilayer ceramic capacitor including: a laminated body including dielectric layers and multiple internal electrodes provided at the multiple interfaces between the dielectric layers; and an external electrode formed on the outer surface of the laminated body, and electrically connected to the internal electrode. The dielectric layers contain, as their main constituent, a perovskite-type compound including Ba, Ti, Zr, and M, where M is at least one element of Ta, Nb, V, and W, and further contain Mn and Si as additive constituents. With respect to the total amount of Ti, Zr, and M, the content of Zr is 40 mol % $\leq$ Zr $\leq$ 90 mol %, and the content of M is 1 mol % $\leq$ M $\leq$ 10 mol %; and when the total amount of Ti, Zr, and M is regarded as 100 parts by mol, the contents of Mn and Si are 1 part by mol $\leq$ Mn $\leq$ 10 parts by mol and 1 part by mol $\leq$ Si $\leq$ 5 parts by mol, and the molar ratio between Mn and M is 0.5 $\leq$ Mn/M $\leq$ 3.0.

A further embodiment of the present invention provides a multilayer ceramic capacitor including: a laminated body including dielectric layers and multiple internal electrodes provided at the multiple interfaces between the dielectric layers; and an external electrode formed on the outer surface of the laminated body, and electrically connected to the internal electrode. The laminated body has a composition containing, as its main constituent, a perovskite-type compound including Ba, Ti, Zr, and M, where M is at least one element of Ta, Nb, V, and W, and the laminated body further contains Mn and Si as additive constituents. When the laminated body is dissolved to provide a solution, with respect to the total amount of Ti, Zr, and M in the solution, the content of Zr is 40 mol % $\leq$ Zr $\leq$ 90 mol %, and the content of M is 1 mol % $\leq$ M $\leq$ 10 mol %; and when the total amount of Ti, Zr, and M is regarded as 100 parts by mol, the contents of Mn and Si are 1 part by mol $\leq$ Mn $\leq$ 10 parts by mol and 1 part by mol $\leq$ Si $\leq$ 5 parts by mol, and the molar ratio between Mn and M is 0.5 $\leq$ Mn/M $\leq$ 3.0.

In addition, in the multilayer ceramic capacitor according to the present invention, preferably, Ba is an element constituting an A site in the main constituent of the perovskite-type compound, whereas Ti, Zr, and M are elements constituting a B site in the main constituent of the perovskite-type compound, and the ratio is 1.00 to 1.03 between the element constituting the A site and the elements constituting the B site.

According to the present invention, because the content of Zr with respect to the total amount of Ti, Zr, and M is 40 mol % < Zr $\leq$ 90 mol %, the Zr reduces oxygen defects, and the element M constituting the B site in the main constituent of the perovskite-type compound serves as a donor, thereby efficiently trapping and anchoring oxygen defects. Therefore, leakage current and insulation resistance degradation at high temperatures are suppressed while ensuring a relatively high relative permittivity.

According to the present invention, leakage current and insulation resistance degradation at high temperatures can be suppressed while ensuring a relatively high relative permittivity (≥50).

The foregoing object, other objects, features, and advantages of the invention will be further evident from the following detailed description taken with reference to the drawings.

DETAILED DESCRIPTION OF THE INVENTION

1. Multilayer Ceramic Capacitor

An embodiment of a multilayer ceramic capacitor according to the present invention will be described.

Figure 1:
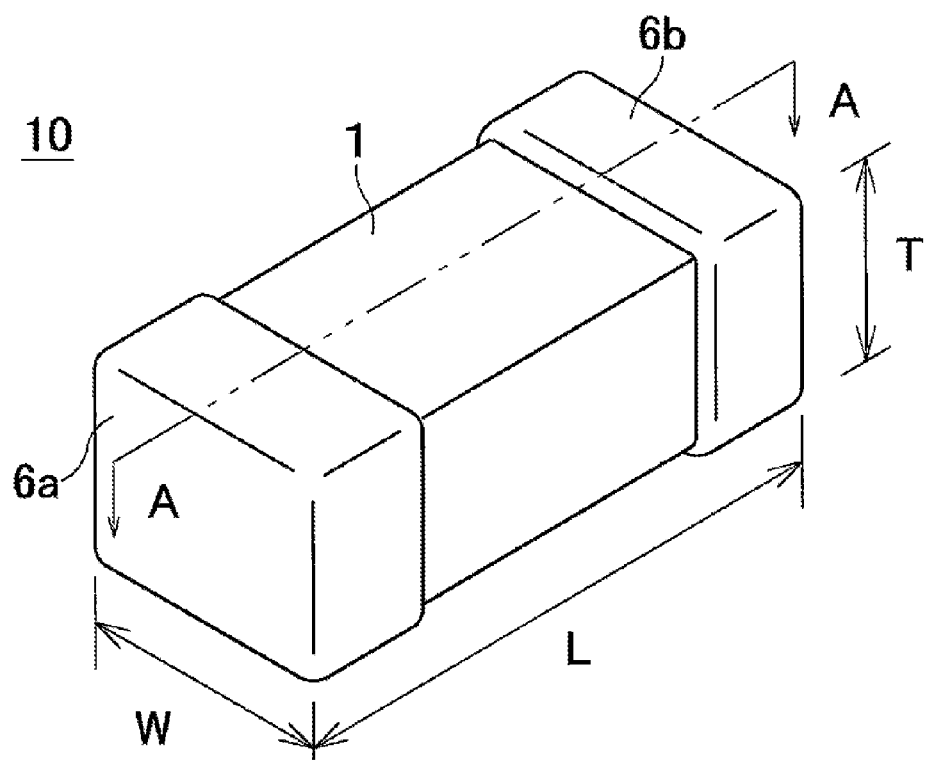
FIG. 1 is an appearance perspective view illustrating an embodiment of a multilayer ceramic capacitor according to the present invention.
Figure 2:
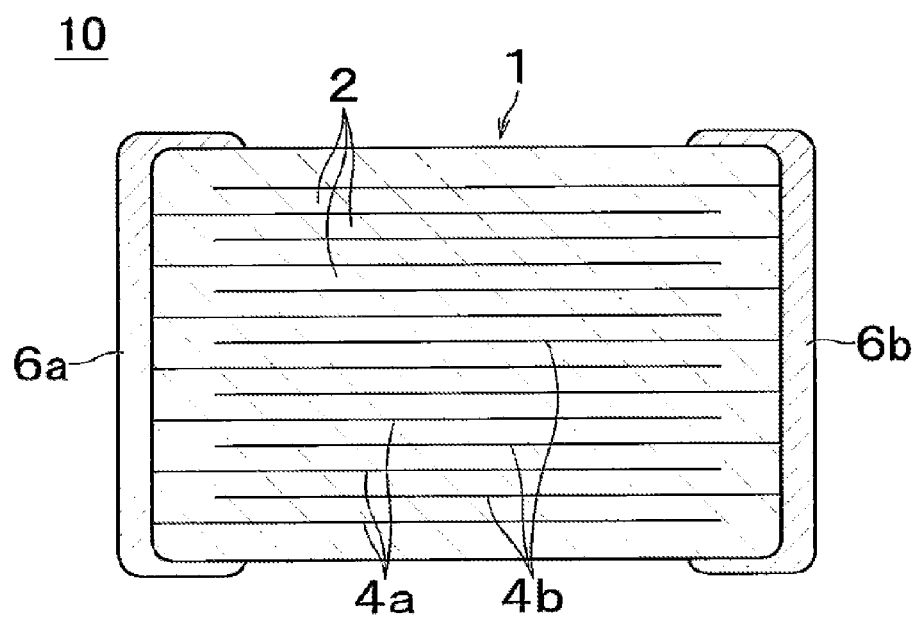
FIG. 2 is a cross-sectional view of FIG. 1 along the line A-A.

FIG. 1 is an appearance perspective view illustrating a multilayer ceramic capacitor 10 according to the present invention. FIG. 2 is a cross-sectional view of FIG. 1 along the line A-A. The multilayer ceramic capacitor 10 includes a substantially cuboidal ceramic laminated body 1, and external electrodes 6a, 6b formed on right and left ends of the ceramic laminated body 1.

The ceramic laminated body 1 is a laminated body where multiple dielectric layers 2 and multiple pairs of internal electrodes 4a, 4b provided at the interfaces between the dielectric layers 2 and opposed to each other with the dielectric layers 2 interposed therebetween are laminated in the direction of a thickness T.

The dielectric layers 2 contain, as their main constituent, a perovskite-type compound including Ba, Ti, Zr, and M. M is at least one element of Ta, Nb, V, and W. Furthermore, the dielectric layers 2 contain Mn and Si as additive constituents.

In addition, the content of Zr with respect to the total amount of Ti, Zr, and M is 40 mol %<Zr≤90 mol %. Furthermore, the content of M is 1 mol %≤M≤10 mol %.

Furthermore, when the total amount of Ti, Zr, and M is regarded as 100 parts by mol, the contents of Mn and Si are 1 part by mol≤Mn≤10 parts by mol and 1 part by mol≤Si≤5 parts by mol, and the molar ratio between Mn and M is 0.5≤Mn/M≤3.0. It is to be noted that M (at least one element of Ta, Nb, V, and W) is a donor element, whereas Mn is an acceptor element.

In addition, when Ba is an element constituting an A site in the main constituent of the perovskite-type compound, whereas Ti, Zr, and M are elements constituting a B site in the main constituent of the perovskite-type compound, the ratio is 1.00 to 1.03 between the element constituting the A site and the elements constituting the B site.

The internal electrodes 4a have ends extended to a left end surface of the ceramic laminated body 1, and electrically connected to the external electrode 6a. The internal electrodes 4b have ends extended to a right end surface of the ceramic laminated body 1, and electrically connected to the external electrode 6b. Further, a capacitor function is achieved at the part where the internal electrodes 4a, 4b are opposed. The internal electrodes 4a, 4b are composed of Ag, Cu, Ni, Pd, or an alloy of the metals.

In the multilayer ceramic capacitor 10 configured as just described, because the content of Zr with respect to the total amount of Ti, Zr, and M is 40 mol %<Zr≤90 mol %, the Zr reduces oxygen defects, and the element M constituting the B site serves as a donor, thereby efficiently trapping and anchoring oxygen defects. Accordingly, the multilayer ceramic capacitor 10 can be achieved which can suppress leakage current and insulation resistance degradation at high temperatures while ensuring a relatively high relative permittivity (≥50).

2. Method for Manufacturing Multilayer Ceramic Capacitor

Figure 3:
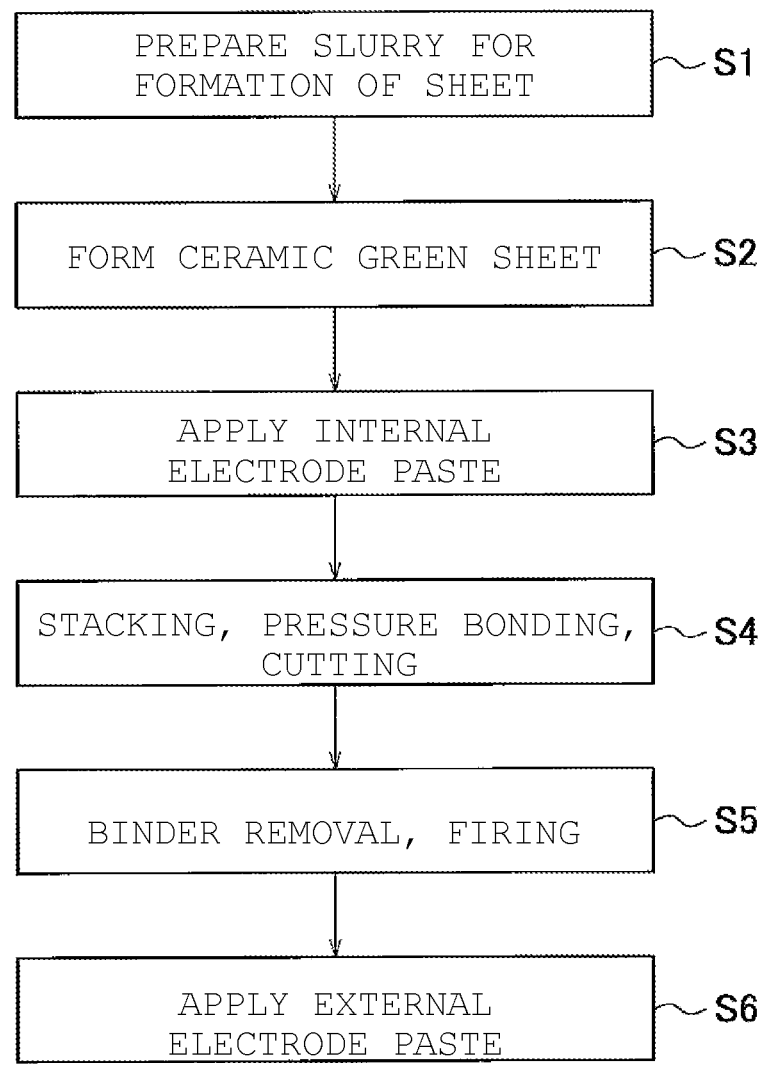
FIG. 3 is a flowchart showing an example of a method for manufacturing the multilayer ceramic capacitor shown in FIG. 1.

Next, an example of a method for manufacturing the multilayer ceramic capacitor 10 will be described. FIG. 3 is a flowchart showing a method for manufacturing the multilayer ceramic capacitor 10.

In a step S1, an organic binder, etc. are added to a ceramic material, thereby preparing slurry for the formation of ceramic green sheets. More specifically, respective powders of $BaCO_3$, $TiO_2$, $ZrO_2$, $V_2O_5$, $Ta_2O_5$, $Nb_2O_5$, and $WO_6$ are prepared as starting raw materials for the main constituent of the perovskite-type compound.

Next, the respective powders are weighed as shown in Table 1. Table 1 shows compositions provided when the constituent is expressed by $Ba_m(Ti,Zr,Ta,Nb,V,W)O_3$. More specifically, the compositions are shown which are adapted such that the content of Ba is 100 parts by mol when the total amount of Ti, Zr, and M (M is at least one element of Ta, Nb, V, and W) is regarded as 100 parts by mol. The respective powders are mixed with a ball mill with water as a medium, and subjected to calcination at 1200° C., and then to grinding, thereby providing a ceramic powder containing a perovskite-type compound as its main constituent. It is to be noted that even when this main constituent contains Ca, Sr, and Hf, there is no difference in the advantageous effect of the invention.

Next, respective powders of $MnCO_3$ and $SiO_2$ are added as starting raw materials for additive constituents to the ceramic powder containing the perovskite-type compound as its main constituent such that the amounts of the respective additive constituents with respect to the total amount 100 parts by mol of Ti, Zr, and M (M is at least one element of Ta, Nb, V, and W) in the main constituent provide the compositions as shown in Table 1 (represented in parts by mol), and then mixed with a ball mill, thereby providing a dielectric raw material powder.

It is to be noted that, even when the starting raw materials include $BaTiO_3$ and $BaZrO_3$ for the compositions, there is no problem with the advantageous effect of the invention, as long as the materials are mixed in predetermined proportions so as to provide the compositions as shown in Table 1. In addition, even when the starting raw materials are mixed by any method other than ball mills, there is no problem with the advantageous effect of the invention as long as the compositions shown in Table 1 are provided.

Next, the dielectric raw material powder is, with the addition of a polyvinyl butyral-based binder and an organic solvent such as ethanol thereto, subjected to wet mixing with a ball mill, thereby preparing slurry for the formation of ceramic green sheets.

Next, in a step S2, the slurry for the formation of ceramic green sheets is formed by a doctor blade method into a sheet such that the fired dielectric layers 2 are 10 μm in thickness, and rectangular ceramic green sheets are obtained.

Next, in a step S3, an internal electrode paste containing Ni is applied by a screen printing method onto the ceramic green sheets, thereby forming electrode paste films to serve as the internal electrodes 4a, 4b.

Next, in a step S4, multiple sheets of the ceramic green sheets with the electrode paste films formed are stacked so as to alternate the directions in which ends of the electrode paste films are extended, and subjected to pressure bonding. The laminated ceramic green sheets are cut into dimensions for individual ceramic laminated bodies 1, which are regarded as multiple unfired ceramic laminated bodies 1.

Next, in a step S5, the unfired ceramic laminated bodies 1 are subjected to binder removal treatment in the air at a temperature of 290° C. Thereafter, the unfired ceramic laminated bodies 1 are subjected to firing for 2 hours at a temperature of 1150 to 1250° C. in a reducing atmosphere of a $H_2$—$N_2$—$H_2O$ gas, thereby providing sintered ceramic laminated bodies 1. The ceramic green sheets and the electrode paste films are subjected to co-firing, thereby turning the ceramic green sheets and the electrode paste films into the ceramic layers 2 and the internal electrodes 4a, 4b, respectively.

Next, in a step S6, an external electrode paste (a Cu paste or an AgPd alloy paste) is applied to both ends of the fired ceramic laminated bodies 1. Thereafter, the external electrode paste on the sintered ceramic laminated bodies 1 is baked at a temperature of 900° C., thereby forming the external electrodes 6a, 6b electrically connected respectively to the internal electrodes 4a, 4b. In this way, the multilayer ceramic capacitor 10 is obtained.

Experimental Example

1. Preparation of Sample

Multilayer ceramic capacitors 10 for samples were prepared by the previously described manufacturing method according to the embodiment, in accordance with the compositions shown in Table 1.

(a) Sample Numbers 1 to 9

As shown in Table 1, the multilayer ceramic capacitors 10 according to sample numbers 1 to 9 were adjusted to vary the content of Zr with respect to the total amount of the elements (Ti, Zr, M) constituting the B site in the main constituent of the perovskite-type compound in the dielectric layers 2.

(b) Sample Numbers 10 to 14

The multilayer ceramic capacitors 10 according to sample numbers 10 to 14 were adjusted so as to vary the type of the element M (at least one element of Ta, Nb, V, and W as donor elements) constituting the B site in the main constituent of the perovskite-type compound in the dielectric layers 2.

(c) Sample Numbers 15 to 19

The multilayer ceramic capacitors 10 according to sample numbers 15 to 19 were adjusted so as to vary the content of the element M (at least one element of Ta, Nb, V, and W as donor elements, more specifically, Ta) constituting the B site in the main constituent of the perovskite-type in the dielectric layers 2, and the content of the element Mn as an additive constituent for the perovskite-type compound in the dielectric layers 2.

(d) Sample Numbers 20 to 23

The multilayer ceramic capacitors 10 according to sample numbers 20 to 23 were adjusted so as to vary the content of the element Ba constituting the A site in the main constituent of the perovskite-type compound in the dielectric layers 2.

(e) Sample Numbers 24 to 29

The multilayer ceramic capacitors 10 according to sample numbers 24 to 29 were adjusted so as to vary the content of the element Si as an additive constituent for the perovskite-type compound in the dielectric layers 2.

(f) Sample Numbers 30 to 34

The multilayer ceramic capacitors 10 according to sample numbers 30 to 34 were adjusted so as to vary the molar ratio between Mn as an acceptor element and M as a donor element by varying the content of the element Mn as an additive constituent for the perovskite-type compound in the dielectric layers 2.

(g) Sample Numbers 35 to 39

The multilayer ceramic capacitors 10 according to sample numbers 35 to 39 were adjusted so as to vary the molar ratio between Mn as an acceptor element and M as a donor element by varying the content of the element M (more specifically, the element Ta) constituting the B site in the main constituent of the perovskite-type compound in the dielectric layers 2.

The external dimensions of the multilayer ceramic capacitor 10 prepared were 1.0 mm in width W, 2.0 mm in length L, and 1.0 mm in thickness T. The dielectric layers 2 were 10 μm in thickness, and the internal electrodes 4a, 4b were 1.0 μm in thickness. In addition, the total number of effective dielectric layers 2 contributing to the capacitor function was 85, and the area of the electrode opposed per layer was 1.6 $mm^2$.

The ceramic laminated body 1 of the multilayer ceramic capacitor 10 prepared was dissolved, and subjected to ICP optical emission spectroscopy, thereby confirming that the composition was almost identical to the composition shown in Table 1, except for Ni in the internal electrodes 4a, 4b.

2. Characterization and Evaluation Method

The prepared multilayer ceramic capacitors for samples were subjected to the following characterization.

(a) Relative Permittivity

For the prepared multilayer ceramic capacitors for samples, the electrostatic capacitance was measured under the conditions of 1 kHz and 1 Vrms at an ambient temperature of 25±2° C. with an impedance analyzer (from Agilent Technologies: HP4194A), and the values of electrostatic capacitance were converted to relative permittivities. For each sample number, thirty multilayer ceramic capacitors were subjected to the measurement, and the average value for relative permittivity was calculated.

(b) High-Temperature Load Life Test

At an ambient temperature of 200° C., a direct-current voltage of 200 V was applied to the prepared multilayer ceramic capacitors for samples, and the current values were measured, thereby measuring changes in insulation resistance with the passage of time. Furthermore, in view of sample shape, the insulation resistances were converted to resistivity values. For each sample number, one-hundred multilayer ceramic capacitors were subjected to the measurement, and the average value for resistivity value was calculated. Then, the samples with resistivity values down to 100 MΩ·m or less were determined to be failures, and the mean time to failure (MTTF) at 50% was obtained from Weibull analysis on time to failure. When the MTTF was shorter than 120 hours, the sample was regarded as being non-standard.

3. Result of Characterization

Table 1 shows the results of the characterization of the multilayer ceramic capacitors according to sample numbers 1 to 39.

permittivity, and long MTTF from 123 hours to 193 hours in the high-temperature load life test.

The multilayer ceramic capacitor 10 according to sample number 9 was excessively high, or 92 mol % in the content

TABLE 1

| Sample Number | Element constituting A Site (parts by mol) Ba | Element constituting B Site (parts by mol) | | | | | | Mn (parts by mol) | Si (parts by mol) | Molar Ratio between Acceptor Element and Donor Element (—) | Relative Permittivity εr (—) | High-Temperature Load Test MTTF (hr.) |
|---|---|---|---|---|---|---|---|---|---|---|---|---|
| | | Ti | Zr | Ta | Nb | V | W | | | | | |
| *1 | 101.0 | 58 | 40 | 2 | — | — | — | 2.0 | 2.0 | 1.0 | 528 | 88 |
| *2 | 101.0 | 58 | 40 | — | 2 | — | — | 2.0 | 2.0 | 1.0 | 510 | 84 |
| 3 | 101.0 | 56 | 42 | 2 | — | — | — | 2.0 | 2.0 | 1.0 | 484 | 123 |
| 4 | 101.0 | 48 | 50 | 2 | — | — | — | 2.0 | 2.0 | 1.0 | 326 | 135 |
| 5 | 101.0 | 38 | 60 | 2 | — | — | — | 2.0 | 2.0 | 1.0 | 167 | 142 |
| 6 | 101.0 | 28 | 70 | 2 | — | — | — | 2.0 | 2.0 | 1.0 | 102 | 155 |
| 7 | 101.0 | 18 | 80 | 2 | — | — | — | 2.0 | 2.0 | 1.0 | 77 | 182 |
| 8 | 101.0 | 8 | 90 | 2 | — | — | — | 2.0 | 2.0 | 1.0 | 51 | 193 |
| *9 | 101.0 | 6 | 92 | 2 | — | — | — | 2.0 | 2.0 | 1.0 | 43 | 200 |
| 10 | 101.0 | 48 | 50 | — | 2 | — | — | 2.0 | 2.0 | 1.0 | 331 | 133 |
| 11 | 101.0 | 48 | 50 | — | — | 2 | — | 2.0 | 2.0 | 1.0 | 324 | 131 |
| 12 | 101.0 | 48 | 50 | — | — | — | 2 | 2.0 | 2.0 | 1.0 | 322 | 123 |
| 13 | 101.0 | 48 | 50 | 1 | — | 1 | — | 2.0 | 2.0 | 1.0 | 324 | 141 |
| 14 | 101.0 | 48 | 50 | — | 1 | — | 1 | 2.0 | 2.0 | 1.0 | 325 | 135 |
| *15 | 101.0 | 29.5 | 70 | 0.5 | — | — | — | 0.5 | 2.0 | 1.0 | 121 | 45 |
| 16 | 101.0 | 29 | 70 | 1 | — | — | — | 1.0 | 2.0 | 1.0 | 110 | 120 |
| 17 | 101.0 | 25 | 70 | 5 | — | — | — | 5.0 | 2.0 | 1.0 | 94 | 177 |
| 18 | 101.0 | 20 | 70 | 10 | — | — | — | 10.0 | 2.0 | 1.0 | 52 | 191 |
| *19 | 101.0 | 18 | 70 | 12 | — | — | — | 12.0 | 2.0 | 1.0 | 43 | 201 |
| 20 | 100.0 | 48 | 50 | 2 | — | — | — | 2.0 | 2.0 | 1.0 | 334 | 120 |
| 21 | 100.5 | 48 | 50 | 2 | — | — | — | 2.0 | 2.0 | 1.0 | 328 | 128 |
| 22 | 102.0 | 48 | 50 | 2 | — | — | — | 2.0 | 2.0 | 1.0 | 320 | 128 |
| 23 | 103.0 | 48 | 50 | 2 | — | — | — | 2.0 | 2.0 | 1.0 | 314 | 122 |
| *24 | 101.0 | 48 | 50 | 2 | — | — | — | 2.0 | 0.5 | 1.0 | Lack of sintering | |
| 25 | 101.0 | 48 | 50 | 2 | — | — | — | 2.0 | 1.0 | 1.0 | 232 | 120 |
| 26 | 101.0 | 48 | 50 | 2 | — | — | — | 2.0 | 3.0 | 1.0 | 310 | 136 |
| 27 | 101.0 | 48 | 50 | 2 | — | — | — | 2.0 | 4.0 | 1.0 | 220 | 133 |
| 28 | 101.0 | 48 | 50 | 2 | — | — | — | 2.0 | 5.0 | 1.0 | 113 | 138 |
| *29 | 101.0 | 48 | 50 | 2 | — | — | — | 2.0 | 6.0 | 1.0 | 33 | 135 |
| *30 | 101.0 | 48 | 50 | 2 | — | — | — | 0.5 | 2.0 | 0.25 | Resistivity of $10^6$ Ω·m or less | |
| 31 | 101.0 | 48 | 50 | 2 | — | — | — | 1.0 | 2.0 | 0.5 | 301 | 121 |
| 32 | 101.0 | 48 | 50 | 2 | — | — | — | 4.0 | 2.0 | 2.0 | 310 | 136 |
| 33 | 101.0 | 48 | 50 | 2 | — | — | — | 6.0 | 2.0 | 3.0 | 223 | 143 |
| *34 | 101.0 | 48 | 50 | 2 | — | — | — | 10.0 | 2.0 | 5.0 | Resistivity of $10^6$ Ω·m or less | |
| *35 | 101.0 | 48 | 50 | 0.5 | — | — | — | 2.0 | 2.0 | 4.0 | Resistivity of $10^6$ Ω·m or less | |
| 36 | 101.0 | 48 | 50 | 1 | — | — | — | 2.0 | 2.0 | 2.0 | 340 | 130 |
| 37 | 101.0 | 48 | 50 | 4 | — | — | — | 2.0 | 2.0 | 0.5 | 310 | 128 |
| *38 | 101.0 | 48 | 50 | 6 | — | — | — | 2.0 | 2.0 | 0.33 | Resistivity of $10^6$ Ω·m or less | |
| *39 | 101.0 | 48 | 50 | 10 | — | — | — | 2.0 | 2.0 | 0.2 | Resistivity of $10^6$ Ω·m or less | |

*Outside the scope of the present invention (a) Sample Numbers 1 to 9

As shown in Table 1, the multilayer ceramic capacitors 10 according to sample numbers 1 and 2 were excessively low, or 40 mol %, in the content of Zr with respect to the total amount of the elements (Ti, Zr, M) constituting the B site in the main constituent of the perovskite-type compound in the dielectric layers 2, thus resulting in short MTTF from 84 to 88 hours in the high-temperature load life test.

The multilayer ceramic capacitors 10 according to sample numbers 3 to 8 were appropriate, or 42 to 90 mol % in the content of Zr with respect to the total amount of the elements (Ti, Zr, M) constituting the B site in the main constituent of the perovskite-type compound in the dielectric layers 2, thus resulting in relatively high values from 51 to 484 in relative of Zr with respect to the total amount of the elements (Ti, Zr, M) constituting the B site in the main constituent of the perovskite-type compound in the dielectric layers 2, thus resulting in a low value of 43 in relative permittivity.

(b) Sample Numbers 10 to 14

The multilayer ceramic capacitors 10 according to sample numbers 10 to 14 achieved, even in varying the type of the element M (at least one element of Ta, Nb, V, and W as donor elements) constituting the B site in the main constituent of the perovskite-type compound in the dielectric layers 2, favorable results almost without undergoing any change in relative permittivity or MTTF in the high-temperature load life test.

(c) Sample Numbers 15 to 19

The multilayer ceramic capacitor 10 according to sample number 15 was excessively low, or 0.5 mol % in the content of the element M (Ta as a donor element) constituting the B site in the main constituent of the perovskite-type in the dielectric layers 2, and excessively low, or 0.5 parts by mol in the content of the element Mn (acceptor element) as an additive constituent for the perovskite-type compound in the dielectric layers 2, thus resulting in short MTTF of 45 hours in the high-temperature load life test.

The multilayer ceramic capacitors 10 according to sample numbers 16 to 18 were appropriate, or 1 to 10 mol % in the content of the element M (Ta as a donor element) constituting the B site in the main constituent of the perovskite-type in the dielectric layers 2, and appropriate, or 1 to 10 parts by mol in the content of the element Mn (acceptor element) as an additive constituent for the perovskite-type compound in the dielectric layers 2, thus resulting in relatively high values from 52 to 110 in relative permittivity, and long MTTF from 120 hours to 191 hours in the high-temperature load life test.

The multilayer ceramic capacitor 10 according to sample number 19 was excessively high, or 12 mol % in the content of the element M (Ta as a donor element) constituting the B site in the main constituent of the perovskite-type in the dielectric layers 2, and excessively high, or 12 parts by mol in the content of the element Mn (acceptor element) as an additive constituent for the perovskite-type compound in the dielectric layers 2, thus resulting in a low value of 43 in relative permittivity.

(d) Sample Numbers 20 to 23

The multilayer ceramic capacitors 10 according to sample numbers 20 to 23 achieved, even in varying the content of the element Ba constituting the A site in the main constituent of the perovskite-type compound in the dielectric layers 2, favorable results almost without undergoing any change in relative permittivity or MTTF in the high-temperature load life test.

(e) Sample Numbers 24 to 29

The multilayer ceramic capacitor 10 according to sample number 24 was excessively low, or 0.5 parts by mol in the content of the element Si as an additive constituent for the perovskite-type compound in the dielectric layers 2, thus failing to any densely sintered ceramic laminated body 1 even when the firing at 1250° C. was applied.

The multilayer ceramic capacitors 10 according to sample numbers 25 to 28 were appropriate, or 1 to 5 parts by mol in the content of the element Si as an additive constituent for the perovskite-type compound in the dielectric layers 2, thus resulting in relatively high values from 113 to 310 in relative permittivity, and long MTTF from 120 hours to 138 hours in the high-temperature load life test.

The multilayer ceramic capacitor 10 according to sample number 29 was excessively high, or 6 parts by mol in the content of the element Si as an additive constituent for the perovskite-type compound in the dielectric layers 2, thus resulting in a low value of 33 in relative permittivity.

(f) Sample Numbers 30 to 34

The multilayer ceramic capacitor 10 according to sample number 30 was excessively low, or 0.25 in the molar ratio between Mn as an acceptor element and M as a donor element, thus resulting in a low insulation resistance with only a value of $10^6$ Ω·m or less in resistivity in the high-temperature load life test.

The multilayer ceramic capacitors 10 according to sample numbers 31 to 33 were appropriate, or 0.5 to 3.0 in the molar ratio between Mn as an acceptor element and M as a donor element, thus resulting in relatively high values of 223 to 310 in relative permittivity, and long MTTF from 121 hours to 143 hours in the high-temperature load life test.

The multilayer ceramic capacitor 10 according to sample number 34 was excessively high, or 5.0 in the molar ratio between Mn as an acceptor element and M as a donor element, thus resulting in a low insulation resistance with only a value of $10^6$ Ω·m or less in resistivity in the high-temperature load life test.

(g) Sample Numbers 35 to 39

The multilayer ceramic capacitor 10 according to sample number 35 was excessively high, or 4.0 in the molar ratio between Mn as an acceptor element and M as a donor element, thus resulting in a low insulation resistance with only a value of $10^6$ Ω·m or less in resistivity in the high-temperature load life test.

The multilayer ceramic capacitors 10 according to sample numbers 36 and 37 were appropriate, or 0.5 to 2.0 in the molar ratio between Mn as an acceptor element and M as a donor element, thus resulting in relatively high values of 310 to 340 in relative permittivity, and long MTTF from 128 hours to 130 hours in the high-temperature load life test.

The multilayer ceramic capacitors 10 according to sample numbers 38 and 39 were low, or 0.2 to 0.33 in the molar ratio between Mn as an acceptor element and M as a donor element, thus resulting in a low insulation resistance with only a value of $10^6$ Ω·m or less in resistivity in the high-temperature load life test.

It is to be noted that the invention is not to be considered limited to the embodiment described above, but various modifications can be made within the scope of the invention.

DESCRIPTION OF REFERENCE SYMBOLS

1: ceramic laminated body
2: ceramic layer
4a, 4b: internal electrode
6a, 6b: external electrode
10: Multilayer Ceramic Capacitor
W: width
L: length
T: thickness

The invention claimed is:

1. A multilayer ceramic capacitor comprising:
a laminated body comprising a plurality of dielectric layers and a plurality of internal electrodes provided respectively at interfaces between adjacent dielectric layers of the plurality of dielectric layers; and
an external electrode on an outer surface of the laminated body, and electrically connected to the plurality of internal electrodes,
the plurality of dielectric layers containing, as their main constituent, a perovskite-type compound comprising Ba, Ti, Zr, and M, where M is at least one element of Ta, Nb, V, and W, and the plurality of dielectric layers further containing Mn and Si as additive constituents,
with respect to a total amount of Ti, Zr, and M, a content of Zr is 40 mol % $\leq$ Zr $\leq$ 90 mol %, and a content of M is 1 mol % $\leq$ M $\leq$ 10 mol %; and
when the total amount of Ti, Zr, and M is regarded as 100 parts by mol, a content of Mn is 1 part by mol $\leq$ Mn $\leq$ 10 parts by mol, a content of Si is 1 part by mol $\leq$ Si $\leq$ 5 parts by mol, and a molar ratio between Mn and M is 0.5 $\leq$ Mn/M $\leq$ 3.0.

2. The multilayer ceramic capacitor according to claim 1, wherein the Ba is an element constituting an A site in the main constituent of the perovskite-type compound, the Ti, the Zr, and the M are elements constituting a B site in the main constituent of the perovskite-type compound, and a ratio between the element constituting the A site and the elements constituting the B site is 1.00 to 1.03.

3. A multilayer ceramic capacitor comprising:
  a laminated body comprising a plurality of dielectric layers and a plurality of internal electrodes provided respectively at interfaces between adjacent dielectric layers of the plurality of dielectric layers; and
  an external electrode on an outer surface of the laminated body, and electrically connected to the plurality of internal electrodes,
  the laminated body having a composition containing, as its main constituent, a perovskite-type compound comprising Ba, Ti, Zr, and M, where M is at least one element of Ta, Nb, V, and W, and the laminated body further contains Mn and Si as additive constituents,
  when the laminated body is dissolved to produce a solution, with respect to a total amount of Ti, Zr, and M in the solution, a content of Zr is 40 mol %$\leq$Zr$\leq$90 mol %, and a content of M is 1 mol %$\leq$M$\leq$10 mol %, and
  when the total amount of Ti, Zr, and M is regarded as 100 parts by mol, a content of Mn is 1 part by mol$\leq$Mn$\leq$10 parts by mol, a content of Si is 1 part by mol$\leq$Si$\leq$5 parts by mol, and a molar ratio between Mn and M is 0.5$\leq$Mn/M$\leq$3.0.

4. The multilayer ceramic capacitor according to claim 3, wherein the Ba is an element constituting an A site in the main constituent of the perovskite-type compound, the Ti, the Zr, and the M are elements constituting a B site in the main constituent of the perovskite-type compound, and a ratio between the element constituting the A site and the elements constituting the B site is 1.00 to 1.03.

5. A dielectric layer material for a multilayer ceramic capacitor, the dielectric layer comprising:
  a main constituent perovskite-type compound comprising Ba, Ti, Zr, and M;
  Mn; and
  Si,
  where M is at least one element of Ta, Nb, V, and W,
  with respect to a total amount of Ti, Zr, and M:
    40 mol %$\leq$Zr$\leq$90 mol %,
    1 mol %$\leq$M$\leq$10 mol %,
  when the total amount of Ti, Zr, and M is regarded as 100 parts by mol:
    1 part by mol$\leq$Mn$\leq$10 parts by mol,
    1 part by mol$\leq$Si$\leq$5 parts by mol, and
    0.5$\leq$Mn/M$\leq$3.0.

6. The dielectric layer material according to claim 1, wherein the Ba is an element constituting an A site in the main constituent perovskite-type compound, the Ti, the Zr, and the M are elements constituting a B site in the main constituent perovskite-type compound, and a ratio between the element constituting the A site and the elements constituting the B site is 1.00 to 1.03.

* * * * *